US012675487B2

(12) United States Patent
 Oriol Hilari et al.

(10) Patent No.: US 12,675,487 B2
(45) Date of Patent: Jul. 7, 2026

(54) CHECKING SQL ASSERTIONS

(71) Applicant: UNIVERSITAT POLITÈCNICA DE CATALUNYA, Barcelona (ES)

(72) Inventors: Xavier Oriol Hilari, Barcelona (ES); Ernest Teniente López, Barcelona (ES)

(73) Assignee: UNIVERSITAT POLITÉCNICA DE CATALUNYA, Barcelona (ES)

( * ) Notice: Subject to any disclaimer, the term of this patent is extended or adjusted under 35 U.S.C. 154(b) by 301 days.

(21) Appl. No.: 18/012,623

(22) PCT Filed: Jun. 23, 2021

(86) PCT No.: PCT/EP2021/067117
 § 371 (c)(1),
 (2) Date: Dec. 22, 2022

(87) PCT Pub. No.: WO2021/259984
 PCT Pub. Date: Dec. 30, 2021

(65) Prior Publication Data
 US 2023/0259511 A1 Aug. 17, 2023

(30) Foreign Application Priority Data
 Jun. 25, 2020 (EP) .................................... 20382561

(51) Int. Cl.
 *G06F 16/2455* (2019.01)
 *G06F 11/34* (2006.01)
 *G06F 16/23* (2019.01)

(52) U.S. Cl.
 CPC .... *G06F 16/24565* (2019.01); *G06F 11/3457* (2013.01); *G06F 16/2379* (2019.01)

(58) Field of Classification Search
 CPC ........... G06F 16/24565; G06F 16/2379; G06F 11/3457
 See application file for complete search history.

(56) References Cited

U.S. PATENT DOCUMENTS

2008/0313232 A1* 12/2008 Edelstein ................ G06F 16/25
 707/E17.058
2020/0226122 A1* 7/2020 Koppelaars ......... G06F 16/2308

OTHER PUBLICATIONS

Wiedey, H, "Implementation of Database Assertions— CodeProject", Sep. 8, 2013 (Sep. 8, 2013), Retrieved from the Internet: URL:https://www.codeproject.com/Articles/594138/ Implementation-of-Database-AssertionsXP055724665; [retrieved on Aug. 24, 2020], 10 pages (Year: 2013).*

(Continued)

*Primary Examiner* — Kannan Shanmugasundaram
(74) *Attorney, Agent, or Firm* — Peter B Scull

(57) ABSTRACT

Methods are disclosed for a RDMS to compile an SQL assertion into SQL statements. RDMS includes SQL assertions including an SQL assertion to be checked and relational tables fulfilling pre-update satisfaction of the SQL assertions. SQL update and SQL assertion affect relational tables having pre-update content. The methods include: creating triggers to simulate, at run-time, SQL update execution by providing prospective tables with differential content according to SQL update without altering the pre-update content of affected tables; converting the SQL assertion into SQL views to determine, at run-time, satisfaction or dissatisfaction of the SQL assertion depending on pre-update content of affected tables and differential content of prospective tables; and creating a procedure configured to commit or abort, at run-time, SQL update execution onto affected tables depending on whether SQL assertion has been determined satisfied or dissatisfied. Systems and computer programs are also disclosed which are suitable to perform said method.

15 Claims, 3 Drawing Sheets

(56)             References Cited

OTHER PUBLICATIONS

Wiedey, H, "Implementation of Database Assertions—CodeProject", Sep. 8, 2013 (Sep. 8, 2013), Retrieved from the Internet: URL:https://www.codeproject.com/Articles/594138/Implementation-of-Database-Assertions XP055724665; [retrieved on Aug. 24, 2020], 10 pages.
Toman et al, D, "Implementing temporal integrity constraints using an active DBMS", Research Issues in Data Engineering, 1994. Active Database Systems. Pr Oceedings Fourth International Workshop on Houston, TX, USA Feb. 14-15, 1994, p. 87-95, Los Alamitos, CA, USA, IEEE Comput. Soc, US, XP010097848, DOI: 10.1109/RIDE.1994.282849 external link, ISBN: 9780818653605.
Kiernan et al, J, "Supporting deductive and active rules on top of a relational dbms", No. 1580, Jan. 1, 1992 (Jan. 1, 1992), pp. 1-25, Inria Rapports De Recherche N 1580, Programme 1 Architecture Parallèles, Bases De Données, Reseaux et Systèmes Distribués, Institut National de Recherche en Informatique et en Automatique, FR Retrieved from the Internet: Dec. 10, 2009.
Bry et al, François, "Integrity verification in knowledge bases", Sep. 14, 1991 (Sep. 14, 1991), Logic Programming, Springer Berlin Heidelberg, Berlin, Heidelberg, pp. 114-139, XP019199669, ISBN: 9783540554608.
Codd, E F, "Relational Completeness of Data Base Sublanguages", Mar. 6, 1972, 38 pages, Retrieved from the Internet: URL:http://citeseerx.ist.psu.edu/viewdoc/download?doi=10.1.1.86.9277&rep=rep1&type=pdf XP055724898.
Oriol et al, Xavier, "Computing repairs for constraint violations in UML/OCL conceptual schemas", Data & Knowledge Engineering, Elsevier BV, NL, vol. 99, Jun. 25, 2015 (Jun. 25, 2015), p. 39-58, XP029281004 DOI: 10.1016/J.DATAK.2015.06.006 external link, ISSN:0169-023X.
International Search Report and Written Opinion of the International Searching Authority. International Application No. PCT/UP2021/067117 issued by the European Patent Office, mail date Sep. 21, 2021, 15 pages, Rijswijk, Netherlands.

* cited by examiner

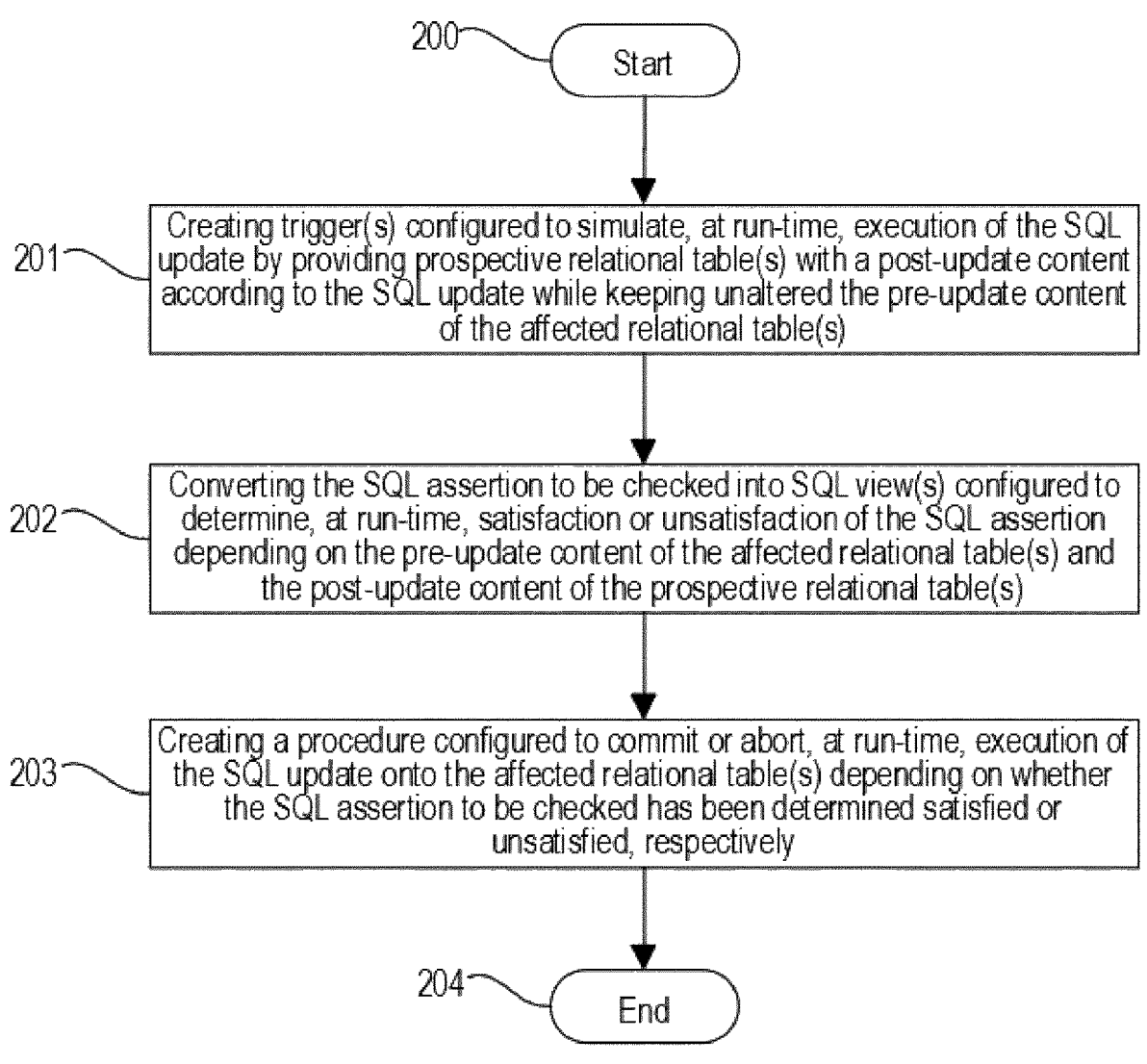

200 — Start

201 — Creating trigger(s) configured to simulate, at run-time, execution of the SQL update by providing prospective relational table(s) with a post-update content according to the SQL update while keeping unaltered the pre-update content of the affected relational table(s)

202 — Converting the SQL assertion to be checked into SQL view(s) configured to determine, at run-time, satisfaction or unsatisfaction of the SQL assertion depending on the pre-update content of the affected relational table(s) and the post-update content of the prospective relational table(s)

203 — Creating a procedure configured to commit or abort, at run-time, execution of the SQL update onto the affected relational table(s) depending on whether the SQL assertion to be checked has been determined satisfied or unsatisfied, respectively 204 — End

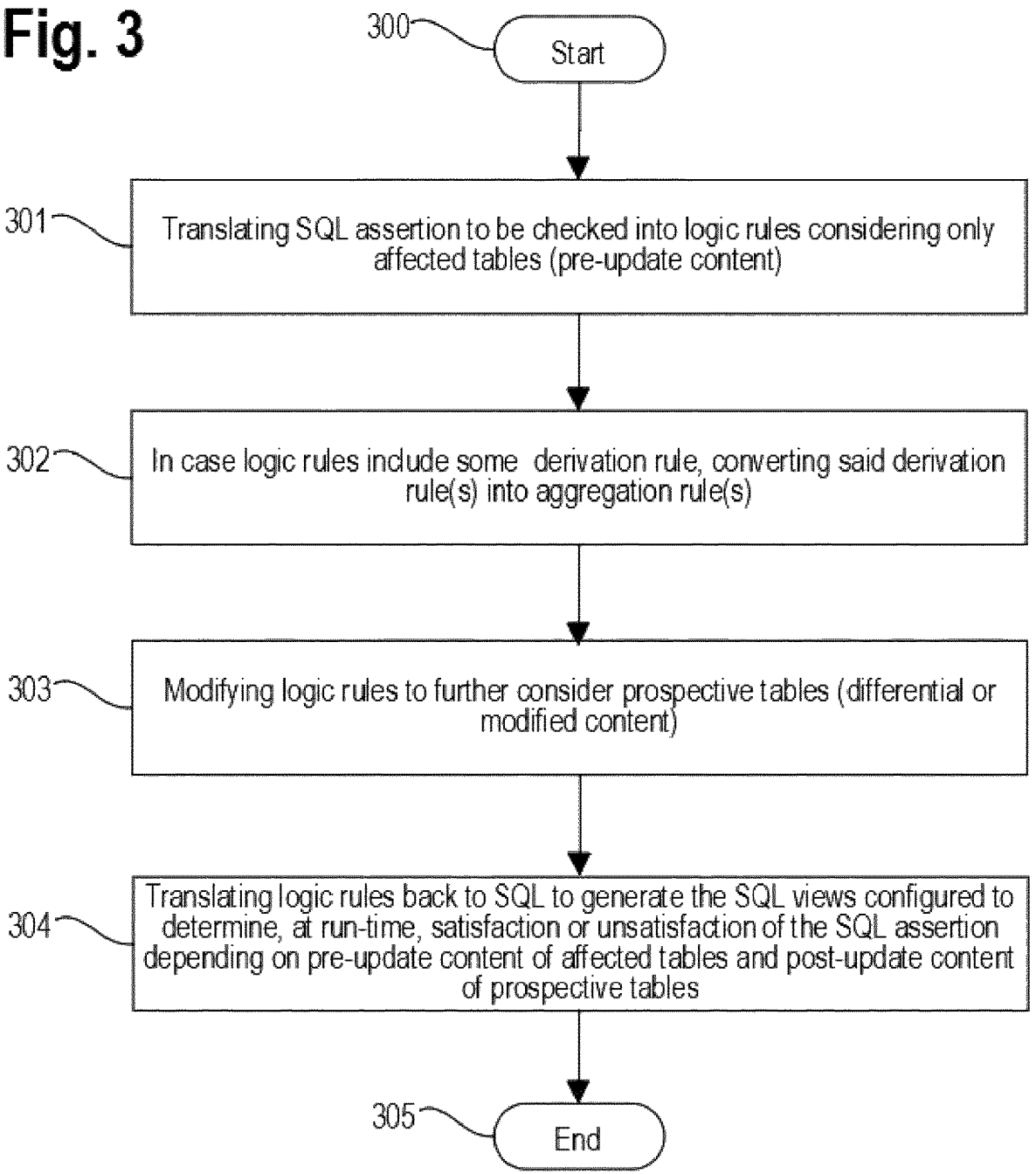

300  Start

301  Translating SQL assertion to be checked into logic rules considering only affected tables (pre-update content)

302  In case logic rules include some derivation rule, converting said derivation rule(s) into aggregation rule(s)

303  Modifying logic rules to further consider prospective tables (differential or modified content)

304  Translating logic rules back to SQL to generate the SQL views configured to determine, at run-time, satisfaction or unsatisfaction of the SQL assertion depending on pre-update content of affected tables and post-update content of prospective tables 305  End

CHECKING SQL ASSERTIONS

The present disclosure relates to methods of compiling an SQL assertion from a Relational Database into SQL statements, so that the compiled SQL statements checks, at run-time, post-update satisfaction of the SQL assertion or, in other words, satisfaction of the SQL assertion after execution of an SQL update. The present disclosure further relates to systems and computer programs suitable for performing such methods.

BACKGROUND

SQL assertions are Boolean SQL statements over a relational database that ideally should always evaluate to true. That is, SQL assertions are supposed to evaluate to true for current state of the data in the database, and after applying any update over the data, the SQL assertion is desired to still evaluate to true. If the update leads the data into a state in which the SQL assertion is violated, the update may be rejected. In some sense, SQL assertions may be seen as a generalization of SQL constraints such as primary key constraints, check column constraints, and foreign key constraints.

Despite SQL assertions were defined more than 25 years ago in the SQL standard 92, none of the current Relational Database Management Systems (RDBMS) appears to implement them. This lack of support of SQL assertions in current RDBMS products may imply relevant drawbacks in the sense that data in a database may result in an inconsistent state if updates performed on data inadvertently violate some constraint linked to SQL assertion(s).

An object of the disclosure is to provide new methods, systems and computer programs aimed at solving at least some of the aforementioned problems.

SUMMARY

In an aspect, a method is provided for a Relational Database Management System, RDMS, to compile an SQL assertion into a set of SQL statements or views configured to check, at run-time, post-update satisfaction of the SQL assertion or, in other words, satisfaction of the SQL assertion after execution of an SQL update. The RDMS comprises SQL assertions including the SQL assertion to be checked and relational tables having a consistent pre-update state or, in other words, a state in which the SQL assertions are satisfied before execution of the SQL update. The SQL update and the SQL assertion to be checked affect or refer to one or more of the relational tables which have a pre-update content or, in other words, a content before execution of the SQL update. Herein, the term "pre-update" thus means before execution of the SQL update, and the term "post-update" means after execution of the SQL update. Pre-update content thus corresponds to data in database table(s) not including data modification(s) to be caused by SQL update. And post-update content corresponds to data in database table(s) including data modification(s) to be caused by SQL update.

The proposed "SQL compilation" method includes creating one or more triggers configured to simulate, at run-time, execution of the SQL update. This simulation includes providing one or more prospective relational tables with a differential or modified content to be caused by execution of the SQL update, while keeping unaltered the pre-update content of the affected relational tables.

The "SQL compilation" method further includes converting the SQL assertion to be checked into SQL statements or views configured to determine, at run-time, satisfaction or dissatisfaction of the SQL assertion depending on the pre-update content of the affected relational tables and the differential or modified content of the prospective relational tables.

The "SQL compilation" method still further includes creating a procedure (or sub-program) configured to commit or abort, at run-time, execution of the SQL update onto the affected relational tables depending on whether the SQL assertion (to be checked) has been determined satisfied or dissatisfied, respectively. The commit of the execution of the SQL update onto the affected relational tables may be defined to transfer, at run-time, the differential or modified content (to be caused by execution of the SQL update) stored in prospective table(s) to or into affected table(s).

The suggested "SQL compilation" method permits an efficient implementation of SQL assertions that may be integrated into any RDBMS. The efficiency comes from an incremental revalidation of the SQL assertion. That is, assuming that the current data (or pre-update content) already satisfies the assertion, the proposed method checks if committing a given update will violate the assertion, or not. To do so, the method only revalidates the SQL assertion for the data affected by the update, instead of having to evaluate the assertion over the whole content of the database.

In some examples, converting the SQL assertion to be checked into SQL statements or views may comprise: translating the SQL assertion to be checked into logics considering the affected relational tables; modifying the logics to further consider the prospective relational tables; and translating the modified logics back to SQL to generate the SQL statements or views. Said conversions or translations from SQL into logics and vice versa may be performed based on well-known Codd's theorem.

In implementations of the method, translating the SQL assertion to be checked into logics may comprise translating the SQL assertion into logical rules including logic denials defining when the SQL assertion is violated, each of the logic denials having following form:

$$\perp \leftarrow L_1 \wedge \ldots \wedge L_n \wedge B;$$

$L_{i=1 \ldots n}$ being ordinary literals defining data existence or inexistence in affected tables, and B is a built-in literal defining selection of said existent or inexistent data causing violation of the SQL assertion.

According to examples, each of the ordinary literals $L_{i=1 \ldots n}$ may be a basic literal or an aggregate literal or a derived literal; and translating the SQL assertion into logical rules may include, in case of derived literal, producing at least one derivation rule defining calculation of the derived literal and, in case of aggregate literal, producing at least one aggregation rule defining calculation of the aggregate literal.

In some configurations, translating the SQL assertion into the logical rules may include applying an unfolding technique to minimize number of produced (or to be produced) derivation rules.

According to some implementations, translating the SQL assertion into logical rules may include translating derived literal and corresponding derivation rule(s) defining calculation thereof into aggregate literal and corresponding aggregation rule(s) defining calculation thereof.

In examples of the method, modifying the logics to further consider the prospective relational tables may include applying a disjunctive normal form transformation so that said modifying of the logics does not produce any logical rule with OR operator.

In implementations, modifying the logics to further consider the prospective relational tables may include applying following formula to each of the logic denials:

$$\perp \leftarrow \bigwedge_{i=1 \ldots j-1}(old(L_i) \wedge new(L_j) \wedge \bigvee_{i=j+1 \ldots n}(old(L_i) \vee new(L_i)) \wedge B;$$

the function old(L) defining that L is true in the pre-update content and remains true with the differential or modified content, and function new(L) represents that the differential or modified content causes L to be true.

In case of L being a basic literal, functions new(L) and old(L) may be defined as follows:

new(L)=new(T)=ins_T, which defines that existence of data T is new if data T is within differential content as to be inserted (ins_T) by the SQL update;

new(L)=new ($\neg$T)=del_T, defining that inexistence of data T ($\neg$T) is new if data T is within differential content as to be deleted (del_T) by the SQL update;

old(L)=old(T)=T$\wedge\neg$del_T, defining that existence of data T is old if data T is within pre-update content (T) and is not within differential content as to be deleted ($\neg$del_T) by the SQL update;

old(L)=old($\neg$T)=$\neg$T$\wedge\neg$ins_T, defining that inexistence of data T ($\neg$T) is old if data T is not within pre-update content ($\neg$T) and is not within differential content as to be inserted ($\neg$ins_T) by the SQL update.

In case of L being an aggregate literal, functions new(L) and old(L) may be defined as follows:

$$new(T(x,y) \wedge w(y,z))=ins\_T(x,y1) \wedge del\_T(x,y2) \wedge T(x,y3) \wedge \overline{w}(y3,z) \wedge w'(y1,y2) \wedge w(y3+y1-y2,z)$$

$$old(T(x,y) \wedge w(y,z))=ins\_T(x,y1) \wedge del\_T(x,y2) \wedge T(x,y3) \wedge w(y3,z) \wedge w(y3+y1-y2,z);$$

L refers to data T(x,y) in which x is a set of GROUP BY columns and y is aggregate value corresponding to said set of GROUP BY columns; and w(y,z) being a condition involving data T(x,y) and transformable into w'(y1, y2) and into $\overline{w}$(y3, z) according to following table:

| w(y, z) | w'(y1, y2) | $\overline{w}$(y3, z) |
|---|---|---|
| y < z | y1 < y2 | y3 >= z |
| y <= z | y1 < y2 | y3 > z |
| y = z | y1 <> y2 | y <> z |
| y >= z | y1 > y2 | y < z |
| y > z | y1 > y2 | y <= z |
| y <> z | y1 <> y2 | y = z |

In some examples, producing at least one aggregation rule defining calculation of the aggregate literal may include: producing insertion aggregation rule(s) defining calculation part of the aggregate literal due to data included in differential content as to be inserted by the SQL update; and producing deletion aggregation rule(s) defining calculation part of the aggregate literal due to data included in differential content as to be deleted by the SQL update.

Aggregation rule defining calculation of aggregate literal in corresponding logic denial may have following form:

$$p(\underline{x},f(y)) \leftarrow L_1 \wedge \ldots \wedge L_n \wedge B.$$

Taking the above general formulation of aggregation rule, insertion aggregation rule(s) may be produced by applying following formula to aggregation rule:

$$ins\_p_j(x,f(y)) \leftarrow \bigwedge_{i=1 \ldots j-1}(old(L_i)) \wedge new(L_j) \wedge \bigvee_{i=j+1 \ldots n}(old(L_i) \vee new(L_i)) \wedge B$$

and/or deletion aggregation rule(s) may be produced by applying following formula to aggregation rule:

$$del\_p_j(x,f(y)) \leftarrow \bigwedge_{i=1 \ldots j-1}(old(L_i)) \wedge new(\neg L_j) \wedge \bigvee_{i=j+1 \ldots n}(L_i) \wedge B.$$

In a further aspect, a system is provided for a Relational Database Management System, RDMS, to compile an SQL assertion into a set of SQL statements or views configured to check, at run-time, post-update satisfaction of the SQL assertion or, in other words, satisfaction of the SQL assertion after execution of an SQL update. The RDMS comprises SQL assertions including the SQL assertion to be checked and relational tables having a consistent pre-update state or, in other words, a state in which the SQL assertions are satisfied before execution of the SQL update. The SQL update and the SQL assertion to be checked affect or refer to one or more of the relational tables which have a pre-update content or, in other words, a content before execution of the SQL update.

The proposed "SQL compilation" system includes a trigger module configured to create one or more triggers adapted to simulate, at run-time, execution of the SQL update. This simulation includes providing one or more prospective relational tables with a differential or modified content to be caused by execution of the SQL update, while keeping unaltered the pre-update content of the affected relational tables.

The "SQL compilation" system further includes an SQL-view module configured to convert the SQL assertion to be checked into SQL statements or views configured to determine, at run-time, satisfaction or dissatisfaction of the SQL assertion depending on the pre-update content of the affected relational tables and the differential or modified content of the prospective relational tables.

The "SQL compilation" system still further includes a procedure module configured to create a procedure (or sub-program) adapted to commit or abort, at run-time, execution of the SQL update onto the affected relational tables depending on whether the SQL assertion (to be checked) has been determined satisfied or dissatisfied, respectively.

In a still further aspect, a computer program is provided comprising program instructions for causing a computer or computing system to perform "SQL compilation" methods such as the ones described in other parts of the disclosure. The computer program may be embodied on a storage medium and/or carried on a carrier signal.

In a still further aspect, a computing system is provided for compiling an SQL assertion into a set of SQL statements or views, the computing system comprising a memory and a processor, embodying instructions stored in the memory and executable by the processor, and the instructions comprising functionality or functionalities to execute "SQL compilation" methods, such as the ones described in other parts of the disclosure.

In some examples, a Relational Database Management System (RDMS) may be further provided including an SQL compilation system and/or an SQL compilation computer program, such as the ones described in other parts of the disclosure.

BRIEF DESCRIPTION OF THE DRAWINGS

Non-limiting examples of the disclosure will be described in the following, with reference to the appended drawings, in which:

FIG. 2 is a flow chart schematically illustrating "SQL compilation" methods, according to examples, which are suitable for being performed by systems according to e.g. FIG. 1.

FIG. 3 is a flow chart schematically illustrating examples of converting SQL assertion into SQL views suitable for SQL compilation methods such as the ones of FIG. 2.

DETAILED DESCRIPTION OF EXAMPLES

Figure 1:
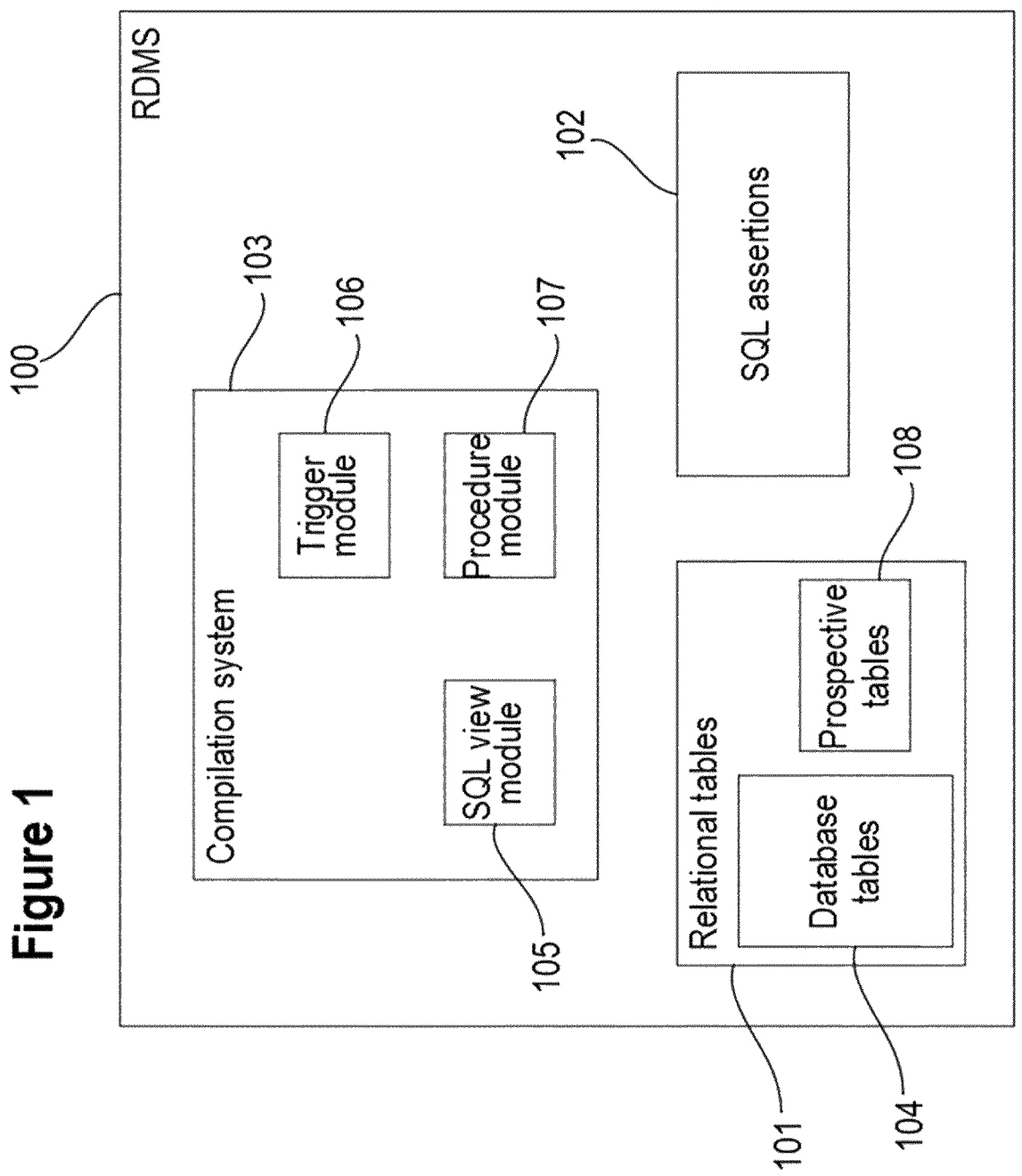
FIG. 1 is a block diagram schematically illustrating "SQL compilation" systems for compiling an SQL assertion, according to examples.

FIG. 1 is a block diagram schematically illustrating a (compilation) system 103 for a RDMS 100 to compile an SQL assertion into a set of SQL statements or views so that the compiled SQL statements check, at run-time, post-update satisfaction of the SQL assertion after execution of an SQL update. The RDMS 100 may comprise a repository of SQL assertions 102 including the SQL assertion to be checked, and a repository or structure of relational tables 101. The "SQL compilation" system 103 may be included in the RDMS 100 as shown in the particular example illustrated.

In the repository of relational tables 101 may coexist two types of tables: database tables 104 and prospective tables 108. The database tables 104 may be defined as tables used to store data of the database that serves corresponding applications, users, software, etc. The database tables 104 may have a consistent pre-update state, which means that the SQL assertions 102 are satisfied in said database tables 104 before execution of the SQL update. The prospective tables 108 may be defined as special, customized tables aimed at storing differential or modified data to be caused by execution of the SQL update, i.e. involved in SQL update simulations.

The "SQL compilation" system 103 may be started or called by/from the RDMS, when a new SQL assertion is created, for causing the RDMS 100 to compile the new SQL assertion into several SQL statements that checks, at run-time, whether execution of an SQL update will violate the SQL assertion.

Given an SQL assertion, the SQL compilation system 103 may return a set of create triggers statements, a set of create with data to be caused by execution of the SQL update instead of updating database tables 104. In other words, execution of the SQL update is simulated by providing prospective tables 108 with differential or modified content, while affected database tables 104 are kept unaltered with pre-update content, i.e. content before execution of the SQL update. The created SQL views may, when executed at run-time, may return whether the SQL update captured or simulated in the prospective tables 108 may violate the SQL assertion in combination with pre-update content in affected database tables 104. The created procedure, when executed at run-time, may run said SQL views and, if no violation of SQL assertion is found, may apply the SQL update by "transferring" differential or modified content within prospective tables 108 into affected database tables 108. Otherwise, if violation is found, execution of the SQL may be discarded.

Thus, the RDMS may update the database tables 104 according to SQL update only if consistency of the compiled SQL assertion is found to be preserved, by invoking the created procedure when SQL update is to be executed. In other words, the created procedure permits simulating execution of the SQL update without updating database tables 104 and, if it is checked that SQL update will not violate the SQL assertion with such simulation, the SQL update may be committed. This commit may be performed by transferring differential or modified or simulated content in prospective tables 108 to corresponding database tables 104.

The SQL assertion to be compiled may define a constraint through an SQL sub-query within an SQL NOT EXISTS statement. Such an SQL sub-query may define relational conditions to determine tuple existence or inexistence within affected relational table(s) violating the constraint.

For instance, consider a database for managing the employees and departments of a company. Employees may work in some Departments and, furthermore, they may manage some of these departments with a specific additional bonus salary for being the manager. Assume it is desired to ensure that any employee managing a department with a high salary bonus (over $500) should work in the same department. This condition may be specified by the following SQL assertion:

---

Assertion 1:

---

```
CREATE ASSERTION 'ImportantManagersWorkInTheirDepts' AS CHECK(
    NOT EXISTS (
        SELECT *
        FROM Manages AS M
        WHERE M.bonusSalary > 500 AND
    NOT EXISTS(SELECT *
    FROM WorksIn AS W
    WHERE M.emp = W.emp and M.dept = W.dept)
    )
)
```

---

SQL views statements, and a create procedure statement. Create triggers statements may be produced by Trigger module 103, create SQL views statements may be produced by SQL-view module 105, and create procedure statement may be produced by Procedure module 107, said modules being shown in FIG. 1 as an exemplary configuration.

At run-time, the RDMS may execute all the create statements provided by the compilation system 103. The created triggers may provoke, at run-time, capturing any SQL update to be executed and providing prospective tables 108

Intuitively, this Assertion 1 includes relational conditions (in SQL sub-query within outermost SQL NOT EXISTS) defining selection of all the managers that violate the constraint, that is, whose bonus salary is higher than $500 but that do not work in the department they manage. Thus, the assertion is satisfied if none of such "problematic" managers exists. As commented before, SQL assertions may generally be written as an SQL sub-query that retrieves the tuples violating the intended constraint and placing such a sub-query inside an SQL NOT EXISTS statement.

Fundamental Logic Concepts

A term t may either a variable or a constant. An atom may be formed by a n-ary predicate p together with n terms, i.e., p(t1, . . . , tn). If all the terms t of an atom are constants, atom may be denominated ground atom. A literal L may be either an atom p(t1, . . . , tn), a negated atom ¬p(t1, . . . , tn), or a built-in literal ti ω tj, where ω is an arithmetic comparison (i.e., <, ≤, =, < >).

A predicate p may be a derived predicate if boolean evaluation of atom p(t1, . . . , tn) depends on some derivation rule(s), otherwise, it may be a base predicate. A derivation rule may have following form:

$$p(t1, . . . ,tn) \leftarrow \varphi(t1, . . . ,tm)$$

In the formula, p(t1, . . . , tn) is an atom called the head of the rule and φ(t1, . . . , tm) is a conjunction of literals called the body. Derivation rules may be restricted to be safe (i.e., any variable appearing in the head or in a negated or built-in literal of the body also appears in a positive literal of the body) and non-recursive. Given several derivation rules with predicate p within its head, p(t1, . . . , tn) is evaluated to true if and only if one of the bodies of such derivation rules is evaluated to true.

An aggregate predicate is a predicate defined over some predicate p that aggregates one of the terms of p with some aggregation function ƒ. An aggregate predicate is defined by a rule:

$$p(t1, . . . ,tn,f(x)) \leftarrow \varphi(t1, . . . ,tm)$$

An atom p(t1, . . . , tn, ƒ(t)) evaluates to true if and only if ƒ(x) is equal to aggregating all values x in φ(t1, . . . , tm) by ƒ, grouped by t1, . . . , tn. E.g. given the aggregate predicate sumSalaries(dept, x) defined by sumSalaries(dept, sum(sal))←Emp(e, dept, sal), sumSalaries(dept, x) evaluates to true if and only if x is equal to the sum of all salaries sal of all the employees within the same dept.

Creation of Triggers to Simulate SQL Update

The "SQL compilation" system 103 may further include a trigger module 106 configured to create trigger(s) configured to simulate, at run-time, execution of the SQL update. Said simulation may be based on providing prospective table(s) 108 with a differential or modified content to be caused by execution of the SQL update. Differential or modified content means data, tuple(s) to be updated (inserted, deleted, modified) by the SQL update when executed. Said differential data, tuple(s) may be provided only to prospective table(s) 108 in order to keep unaltered the pre-update content of the relational table(s) 104 affected (i.e. to be updated) by the SQL update.

Such a trigger-based simulation at run-time is aimed at delaying any commit of the SQL update until it is ensured that it will not violate constraint(s) defined by SQL assertion. Thus, the basic idea is to capture the SQL update and store it internally in prospective table(s) 108 until non-violation of the SQL assertion has been checked, instead of committing the SQL update directly.

With this purpose, for any given table T in database tables 104, two prospective tables 108 may be defined: ins_T and del_T, with same schema as table T. Table ins_T may be defined to contain all the tuples to be inserted by the SQL update into T, and del_T all the tuples to be deleted by the SQL update from T. Tuple modifications, i.e. attribute modifications, may be encoded or treated as an insertion and a deletion of the same tuple with some different value. No specific prospective table for attribute modifications may thus be required.

For instance, given a database table called Manages with attributes "Emp", "Dept", and "Salary", prospective tables ins_Manages and del_Manages may be defined or created with at least same three attributes as table Manages.

To populate these prospective tables, SQL Triggers may be used. That is, for each table T, three triggers may be built: one trigger for capturing insertions on T and storing them into ins_T, another trigger for capturing deletions on T and storing them into del_T, and a last trigger for capturing attribute modifications on T and storing them into ins_T and del_T.

For instance, for the table Manages, the Trigger module 106 may create following Triggers (syntax may vary depending on the RDBMS):

| Trigger 1 |
|---|
| CREATE TRIGGER ins_Manages_trigger ON Manages BEFORE INSERT AS BEGIN INSERT INTO ins_MANAGES SELECT * FROM INSERTED END; CREATE TRIGGER del_Manages_trigger ON Manages BEFORE DELETE AS BEGIN INSERT INTO del_MANAGES SELECT * FROM DELETED END; CREATE TRIGGER update_Manages_trigger ON Manages BEFORE UPDATE AS BEGIN INSERT INTO ins_MANAGES SELECT * FROM INSERTED; INSERT INTO del_MANAGES SELECT * FROM DELETED END; |

Conversion of SQL Assertion into SQL Statements

The "SQL compilation" system 103 may further comprise a SQL-view module 105 configured to convert the SQL assertion to be checked into SQL statements or views adapted to determine, at run-time, satisfaction or dissatisfaction of the SQL assertion. Said satisfaction or dissatisfaction may be determined depending on simulated post-update content, i.e. pre-update content of the affected database table(s) 104 and differential or modified content of the prospective table(s) 108.

An example of steps performed by this SQL view module 105 to obtain such SQL statements or views are shown in FIG. 3. In essence, the SQL view module 105 first translates SQL assertion into logic based representation which may be based on logic denial(s). This logic denial(s) states when database tables 104 violates the SQL assertion. Afterwards, logic denial(s) may be simplified by removing logic derivation rule(s), if any, and converting them into logic aggregation rules. This transformation permits reducing number of cases that the method has to deal with. From there, the SQL view module 105 may convert the simplified logic rules into some new logic rules that further take into account prospective tables 108. In particular, such new logic rule(s) may define when differential or modified content stored in the prospective tables causes violation of the compiled SQL assertion along with pre-update content of the database tables 104. The SQL view module 105 may finally convert these last logic rules back into SQL, and in particular, into SQL views.

Translating SQL into Denials

The SQL assertion to be checked may be translated into logics by translating the relational conditions (defined by the SQL sub-query in the SQL assertion) into first-order logic denials.

A first-order logic denial may have n ordinary literal(s) $(L_{i=1\ ...\ n})$ and built-in literal(s) (B), and may be expressed as follows:

$$\perp\leftarrow L_1\wedge\ ...\ \wedge L_n\wedge B \qquad\qquad \text{Formula 1}$$

An ordinary literal $(L_{i=1\ ...\ n})$ may correspond to relational condition(s) defining existence or inexistence of tuple(s) within affected relational table(s). A built-in literal (B) may correspond to relational condition(s) defining a selection from among tuple(s) whose existence or inexistence is defined by ordinary literal(s). Said selection may e.g. be defined depending on an attribute of the tuple(s) and pertinent comparison operator.

Considering the above exemplary Assertion 1, this particular SQL assertion may be translated into following first-order logic denial:

$$\perp\leftarrow Manages(e,d,s)\wedge s{>}500\wedge\neg WorksIn(e,d) \qquad \text{Denial 1}$$

In plain terms, this first-order logic Denial 1 states that there is a violation if there is some e managing d, with a bonus salary greater than 500, when e does not work in d.

The translation from SQL assertions into logic denials, and vice versa, may be performed automatically. This is because SQL assertions are written in a similar way as logic denials. Indeed, an SQL assertion is written in the form of "CREATE ASSERTION '[assertion name]' CHECK NOT EXISTS ([SQL query])", that is, SQL assertions may describe what cannot happen in the database, in the very same manner as logic denials may do.

Taking this into account, the translation of a SQL assertion into a logic denial may result into:

$$\perp\leftarrow TrQuery(sqlQuery) \qquad\qquad \text{Formula 2}$$

TrQuery being a function that translates the sqlQuery into logics. According to Codd's Theorem, it is already known how to translate the core of SQL queries (i.e., relational algebra expressions) into first-order logics. Moreover, this translation may be extended to translate SQL with aggregates into logics with aggregate literals.

For reasons of completeness, a translation function from SQL with aggregates into logics with aggregate literals is provided in following Tables 1-5, in which left column represents the SQL (sub-) expression to be translated, middle column represents the logic result, and right column contains explanations/clarifications.

TABLE 1

| Translation of SQL Query | | |
|---|---|---|
| TrQuery( | query(TrTerm(t1, ..., tn)) | A query may be translated |
| SELECT t1, ... tn, | | as a new derived literal |
| sqlBody | query(TrTerm(t1, ..., tn)) :- | that contains its result. |
| ) | TrBody(sqlBody) | The derivation rule may be |
| | | obtained by translating the |
| | | body of the query |
| TrQuery( | union(TrTerms(t1, ..., tn)) | A union of queries may be |
| Query1 | | translated with a |
| UNION | union(TrTerm(t1, ..., tn)) :- | derivation rule that unifies |
| Query2 | TrQuery(quer1) | the result of both queries |
| ) | | |
| | union(TrTerm(t1, ..., tn)) :- | |
| | TrQuery(query2) | |

TABLE 2

| Translation of SQL Body | | |
|---|---|---|
| TrBody( | TrFrom(fromClause) $\wedge$ | The from clause may be |
| FROM fromClause | TrWhere(whereClause) | translated firstly, and the |
| WHERE | | where clause secondly, |
| whereClause | | and both translations may |
| ) | | be combined with a |
| | | conjunction |
| TrBody ( | Group(TrTerms(t1, ... tn)) $\wedge$ | The GroupBy may be |
| sqlBody | TrWhere(havingClause) | translated as a new |
| GROUP BY t1, ... tn, | | derived literal. The Having |
| HAVING | Group(TrTerms(t1, ... tn)) :- | clause may become the |
| havingClause | TrBody(sqlBody) | translation of a where |
| ) | | clause over such literal. |
| | | The derived literal may be |
| | | built by translating the |
| | | sqlBody. |

TABLE 3

| Translation of FROM clause | | |
| --- | --- | --- |
| TrFrom( TableName ) | TableName(t1, t2, ..., tn) | For a given table reference, where the referenced table has n-columns, a new literal with n-terms may be generated |
| TrFrom( sqlSubquery ) | TrQuery(sqlSubquery) | If there is a subquery in the FROM clause, said subquery may be translated as a query. |
| TrFrom( A1, ..., AN ) | TrFrom(A1) $\land$ ... $\land$ TrFrom(AN) | All the table expressions in the FROM separated by commas may be translated individually and combined with logic operator $\land$ (and) |
| TrFrom( A JOIN B ON C ) | TrFrom(A) $\land$ TrFrom(B) $\land$ TrWhere(C) | For a given JOIN, both parts of the join may be translated, and then its condition. All the translation results may be combined through logic operator $\land$ (and) |

TABLE 4

| Translation of WHERE Clause | | |
| --- | --- | --- |
| TrWhere( T1 opComp T2 ) | TrTerm(T7) opComp TrTerm(T2) | opComp may be =, <, <=, >=, or any other comparison operator over two SQL terms. |
| TrWhere( A AND B ) | TrWhere(A) $\land$ TrWhere(B) | Both Boolean expressions may be translated and combined with logic operator $\land$ (and) |
| TrWhere( A OR B ) | or(TrTerms(t1, ..., tn)) or(TrTerms(t1, ..., tn))) :- TrWhere(A) or(TrTerms(t1, ..., tn))) :- TrWhere(B) | Both Boolean expressions may be translated and combined with a new derivation rule. |
| TrWhere( NOT A ) | $\neg$a(TrTerms(t1, ..., tn)) a(TrTerms(t1, ..., tn))) :- TrWhere(A) | A may be translated and wrapped inside a NOT through a derivation rule |
| TrWHERE( T IN sqlQuery ) | TrTerm(T) = t1 $\land$ TrQuery(sqlSubquery) | The subquery and the term T may be translated, and the translation of the term T may be equalled to the unique term t1 returned by the subquery |
| TrWHERE( EXISTS sqlQuery ) | TrQuery(sqlSubquery) | The subquery may be translated as query |

TABLE 5

| Translation of Terms | | |
| --- | --- | --- |
| TrTerm( columnName ) | columnName | Each columnName reference may be translated into a variable with the same name |
| TrTerm( constantK ) | constantK | Each constant may be translated into the same constant |
| TrTerm( aggregate (t1) ) | aggregate(TrTerm(T1)) | Aggregate function may be translated into same aggregate function |

From this basic translation, unfolding may be applied to reduce the number of obtained derivation rules, if any. Unfolding is a transformation technique which replaces a positive derived literal appearing in the body of a logic rule by its definition (i.e. the set of literals in the body of its derivation rule).

Translating Derivation Rules into Aggregation Rules

Once the SQL assertion has been translated into logic denial(s) and some logic denial includes derived literal (e.g. derived negation), said logic denial(s) with derived literal(s) may be converted into logic denial(s) with distributive aggregation. This may be implemented in following manner.

Considering a negated derived literal generally expressed as "$\neg L(x1, \ldots, xn)$" with a derivation rule like "$L(x1, \ldots, xn) \leftarrow A1 \land \ldots \land Am$", corresponding new aggregate literal generally expressed as "L_agg(x1, . . . , xn, count( ))←A1∧ . . . ∧Am" may be generated.

Intuitively, the aggregate literal "L_agg(x1, . . . , xn, count( ))" counts how many times the rule "A1, . . . Am" derives the literal "L(x1, . . . , xn)".

Once such aggregate literal has been created, any occurrence of "¬L(x1, . . . , xn)" may be replaced by "L_agg(x1, . . . , xn, y)∧y=0". This is a sound replacement since, roughly speaking, a derived literal is false if and only if the counter of how many times it is derived as true equals 0. This replacement may be done in any rule appearing in the logics (denial or derivation rule).

Such a transformation may be applied for every negated derived literal appearing in the logics (derived from SQL assertion). This way, an equivalent logic specification without derived negation (i.e. logic specification with derived negative literals replaced by count aggregations) may be eventually obtained.

Modifying the logics (derived from SQL assertion) to further consider the prospective relational tables will be conceptually explained below with reference to previous first-order logic Denial 1.

In the following, it is shown an example involving an SQL assertion with derived negation, as given by Assertion 2:

---

Assertion 2:

---

```
CREATE ASSERTION 'DepartmentsHaveOneSeniorEmployee' AS
CHECK(
    NOT EXISTS (
        SELECT *
        FROM Department AS D
        WHERE NOT EXISTS(SELECT *
        FROM WorksIn AS W JOIN Employee AS E ON (W.emp = E.emp)
        WHERE D.dept = W.dept AND E.age > 40)
    )
)
```

---

This Assertion 2 may be translated into following logic rules by applying translation principles described in other parts of the disclosure:

$$\perp \leftarrow Department(d)\wedge\neg MinOneSenior(d) \qquad \text{Rule 1}$$

$$MinOneSenior(d,count(e))\leftarrow WorksIn(e,d)\wedge Employee(e,age)\wedge age{>}40 \qquad \text{Rule 2}$$

Rule 1 is a denial, that is, a logic formula that states when there is a constraint violation, but Rule 2 is a derivation rule (similar to a SQL view, or SQL subquery). The denial of Rule 1 states that there is a violation if there is some department d that does not appear in the MinOneSenior view, and Rule 2 states that the MinOneSenior view contains all departments d which have at least one employee e with an age greater than 40.

Any rule like the previous Rule 1 may be translated into another one (following Rule 3) using distributive aggregates, and any rule like the previous Rule 2 may be redefined accordingly (following Rule 4).

$$\perp \leftarrow Department(d)\wedge SeniorCounter(d,x)\wedge x{=}0 \qquad \text{Rule 3}$$

$$SeniorCounter(d,count(e))\leftarrow WorksIn(e,d)\wedge Employee(e,age)\wedge age{>}40 \qquad \text{Rule 4}$$

Rule 3 is a denial stating a violation in case there is a department d whose counter of senior is x and x is equal to 0. Rule 4 states how this counting may be performed. That is, Rule 4 counts, for each department d, the number of employees older than 40 that work in department d.

Adding Prospective Tables to Denials

Returning to Denial 1, it may be modified to assert when some insertions/deletions (i.e. differential or modified content) may cause a constraint violation. This Denial 1 only states when current data (or pre-update content) rises a constraint violation, but the ultimate goal is to know when some insertions/deletions on current data (or pre-update content) may cause such a violation.

Intuitively, a literal is true in the database tables 104 after applying the SQL update because it is either new (i.e., it was false in the database tables 104, but the SQL update causes it to be true), or because it is old (i.e., it was true in the database tables 104, and the SQL update does not cause any alteration on it). For instance, after applying the SQL update, a literal Manages(e, d, s) is true in the database tables 104 just because one of the two conditions (connected by OR operator) in the following formula is satisfied:

$$ins\_Manages(e,d,s)\vee(Manages(e,d,s)\wedge\neg del\_Manages(e,d,s)) \qquad \text{Formula 3}$$

i.e., either there is an insertion of Manager, or the tuple was already true and there is no deletion of it (it is not to be deleted by the SQL update).

Similarly, a literal is false in database tables 104 after applying the SQL update because something new happened (i.e., it was true in the database tables 104, but the SQL update makes it false), or because it was false in pre-update content of database tables 104 and nothing happened to it (i.e., the SQL update does not make it true). For instance, a literal WorksIn(e, d) is false because one of the two conditions (connected by OR operator) in the following formula is satisfied:

$$del\_WorksIn(e,d)\vee(\neg WorksIn(e,d)\wedge\neg ins\_WorksIn(e,d)) \qquad \text{Formula 4}$$

i.e., there is either a deletion of WorksIn, or the tuple was not previously in the database tables and it has not been inserted (it is not to be inserted by the SQL update).

Thus, since it is wanted to check the Denial 1 according to the state of the data to be reached through the insertions/deletions (to be performed by the SQL update), the literals in the Denial 1 may be replaced with corresponding insertions/deletions that lead to its satisfaction. In the proposed example, it may suffice to replace the literal Manages(e, d, s) for the Formula 3 and ¬WorksIn for the Formula 4. Then, after transforming the resulting expression into disjunctive normal form, the following denials may be obtained:

$$\perp \leftarrow ins\_Manages(e,d,s)\wedge s{>}500\wedge del\_WorksIn(e,d) \qquad \text{Denial 2}$$

$$\perp \leftarrow ins\_Manages(e,d,s)\wedge s{>}500\wedge\neg WorksIn(e,d)\wedge\neg ins\_WorksIn(e,d) \qquad \text{Denial 3}$$

$$\perp \leftarrow Manages(e,d,s)\wedge\neg del\_Manages(e,d,s)\wedge s{>}500\wedge del\_WorksIn(e,d) \qquad \text{Denial 4}$$

$$\perp \leftarrow Manages(e,d,s)\wedge\neg del\_Manages(e,d,s)\wedge s{>}500\wedge\neg WorksIn(e,d)\wedge\neg ins\_WorksIn(e,d) \qquad \text{Denial 5}$$

Intuitively, Denial 2 states that there is a violation if it is inserted that e will manage d, when e has a high bonus salary and, at the same time, it is deleted that e works in d (i.e. e will not work in d anymore). Differently, Denial 3 states that there is a violation if it is inserted that e will manage d, when e has a high bonus salary, and e was not working in d and it is not inserted e to work in d. Denial 4 behaves similarly.

Denial 5 states, roughly speaking, that if the constraint was already violated (i.e., there was a manager e of department d, with a high bonus salary, not working for department d) and no update is applied, then, the constraint is still violated. Since it is assumed that the state of the data prior the SQL update is consistent (i.e. database tables 104 have consistent pre-update state) or, in other words, data in database tables 104 satisfy the SQL assertions, Denial 5 may be safely omitted.

In general, modifying the logics to further consider the prospective relational tables may include generating n−1 rules for each of the first-order logic denials ( $\perp L_1 \wedge \ldots \wedge L_n \wedge B$ ) according to following formula:

$$\perp \leftarrow \bigwedge_{i=1 \ldots j-1} (\text{old}(L_i) \wedge \text{new}(L_j) \wedge \bigvee_{i=j+1 \ldots n} (\text{old}(L_i) \vee \text{new}(L_i)) \wedge B \qquad \text{Formula 5}$$

old($L_i$)=old(T) and new($L_j$)=new(T) taking into account that the ordinary literal $L_i$, $L_j$ refers to atom(s) T being true (or data T existing) in affected table(s), and old($L_i$)=old($\neg$T) and new($L_j$)=new ($\neg$T) taking into account the ordinary literal $L_i$, $L_j$ refers to atom(s) T being false (or data T in existing) in affected table(s).

old(T) may conceptually mean that atom(s) T (or existence of data T) is old; that is, atom(s) T (or existence of data T) is true in pre-update content of affected table(s) and the SQL update will not change said atom(s) T (or existence of data T) to false.

new(T) may conceptually mean that atom(s) T (or existence of data T) is new; that is, SQL update will change atom(s) T (or existence of data T) to true in affected table(s).

old($\neg$T) may conceptually mean that false evaluation of atom(s) T (or inexistence of data T) is old; that is, atom(s) T (or existence of data T) is false in pre-update content of affected table(s) and SQL update will not change said atom(s) T (or existence of data T) to true.

new($\neg$T) may conceptually mean that false evaluation of atom(s) T (or inexistence of data T) is new; that is, SQL update will change atom(s) T (or existence of data T) to false in affected table(s).

New/Old Maps for Base Literals

New/old expressions in Formula 5 for basic (or non-aggregate) literals may be resolved according to following new/old maps:

$$\text{new}(T)=\text{ins\_}T$$

$$\text{new}(\neg T)=\text{del\_}T$$

$$\text{old}(T)=T \wedge \neg \text{del\_}T$$

$$\text{old}(\neg T)=\neg T \wedge \neg \text{ins\_}T \qquad \text{New/old maps 1}$$

Intuitively, tuple/data T is new if it is inserted, and old if it already existed before the SQL update and it is not deleted by the SQL update. Similarly, absence or inexistence of tuple/data T (written in logics as $\neg$T) is new if it is deleted, and old if it did not exist before SQL update and it is not inserted by SQL update.

In the particular example of Denial 1 ( $\perp \leftarrow$ Manages (e,d,s)$\wedge$s>500 $\wedge \neg$ WorksIn(e,d)), the application of general Formula 5 to it may be summarized in following step-by-step description, taking into account that $L_1$=Manages (e,d, s), $L_2$=$\neg$WorksIn(e,d), and B=s>500 in $\perp \leftarrow L_1 \wedge \ldots \wedge L_n \wedge$B.

Step 1: Application of general Formula 5 to Denial 1 for j=1 may produce following denial:

$$\perp \leftarrow \text{new}(\text{Manages}(e,d,s)) \wedge s>500 \wedge (\text{old}(\neg \text{WorksIn}(e,d)) \vee \text{new}(\neg \text{WorksIn}(e,d))) \qquad \text{<Denial j=1>}$$

Step 2: Application of general Formula 5 to Denial 1 for j=2 may produce following denial:

$$\perp \leftarrow \text{old}(\text{Manages}(e,d,s)) \wedge s>500 \wedge \text{new}(\neg \text{WorksIn}(e, d)) \qquad \text{<Denial j=2>}$$

Step 3: Elimination of logic operator $\vee$ in <Denial j=1> may produce following denials:

$$\perp \leftarrow \text{new}(\text{Manages}(e,d,s)) \wedge s>500 \wedge \text{new}(\neg \text{WorksIn}(e,d)) \qquad \text{<Denial j=1a>}$$

$$\perp \leftarrow \text{new}(\text{Manages}(e,d,s)) \wedge s>500 \wedge \text{old}(\neg \text{WorksIn}(e,d)) \qquad \text{<Denial j=1b>}$$

Step 4: Application of New/old maps 1 to <Denial j=1a> produces Denial 2 conceptually/intuitively inferred in previous practical example regarding Denial 1:

$$\perp \leftarrow \text{ins\_Manages}(e,d,s) \wedge s>500 \wedge \text{del\_WorksIn}(e,d) \qquad \text{Denial 2}$$

Step 5: Application of New/old maps 1 to <Denial j=1b> produces Denial 3 conceptually/intuitively derived in previous practical example regarding Denial 1:

$$\perp \leftarrow \text{ins\_Manages}(e,d,s) \wedge s>500 \wedge \neg \text{WorksIn}(e, d) \wedge \neg \text{ins\_WorksIn}(e,d) \qquad \text{Denial 3}$$

Step 6: Application of New/old maps 1 to <Denial j=2> produces Denial 4 conceptually/intuitively deduced in previous practical example regarding Denial 1:

$$\perp \leftarrow \text{Manages}(e,d,s) \wedge \neg \text{del\_Manages}(e, d,s) \wedge s>500 \wedge \text{del\_WorksIn}(e,d) \qquad \text{Denial 4}$$

Note that general Formula 5 is defined to avoid generation of any denial that only depends on pre-update content, i.e. with no influence of differential or modified content (to be generated by execution of the SQL update). In particular, Denial 5 conceptually/intuitively suggested in previous practical example regarding Denial 1 is not generated by application of general Formula 5.

New/Old Maps for Aggregate Literals

New/old expressions in Formula 5 for denials obtained from SQL assertion based on relational algebra with distributive aggregation (either because it contains an aggregate literal or because it is defined through derived negation which, as shown in other parts of this disclosure, may be rewritten as an aggregate literal) may follow a different pattern than those for base literals.

A distributive aggregate is an aggregate operation which may be incrementally recomputed using the aggregate value of the data to be inserted/deleted by the SQL update. For instance, COUNT(*) is a distributive aggregate. Indeed, given the counter of senior employees for each department, this aggregate may be incrementally recomputed if both the COUNT(*) of senior employees to be inserted for each department and the COUNT(*) of senior employees to be deleted for each department are known. SUM(*) is also a distributive aggregate.

Distributive aggregation specific conversion will be described based on following SQL assertion.

---

Assertion 3:

```
CREATE ASSERTION 'DepartmentsHaveOneHundredSeniorEmployees'
AS CHECK(
      NOT EXISTS (
        SELECT *
        FROM Department AS D,
      (SELECT W.dept, count(E.emp) as x
      FROM WorksIn AS W
      JOIN Employee AS E ON (W.emp = E.emp)
          WHERE E.age > 40
          GROUP BY W.dept
      ) AS SenCounter
    WHERE D.dept = SenCounter.dept AND SenCounter.x = 100)
      )
)
```

This Assertion 3 may be translated into following logic rules by applying translation principles described in other parts of the disclosure:

$$\perp \leftarrow Department(d) \wedge SeniorCounter(d,x) \wedge x=100 \qquad \text{Rule 5}$$

$$SeniorCounter(d,count(e)) \leftarrow WorksIn(e,d) \wedge Employee$$
$$(e,age) \wedge age{>}40 \qquad \text{Rule 6}$$

Rule 5 is a denial, that is, a logic formula that states when there is constraint violation, and Rule 6 is a derivation rule (similar to a SQL view or SQL subquery). The denial of Rule 5 states that there is a violation if there is a department d whose counter of senior is x and x is equal to 100. Rule 6 states how this counting may be performed, i.e. Rule 6 counts, for each department d, the number of employees older than 40 that work in d.

Since Rule 5 is a logic denial, it may be processed by applying general Formula 5 to said Rule 5. In this case, new/old maps other than previously described new/old maps 1 may be used for aggregate literals. In the particular example of Rule 5, SeniorCounter(d,x) is an aggregate literal. Such other new/old maps for a tuple T(x, y), where x is a set of group by columns and y the aggregate value of said set of group by columns, may be defined as follows:

$$new(T(x,y) \wedge w(y,z))=ins\_T(x,y1) \wedge del\_T(x,y2) \wedge T(x,$$
$$y3) \wedge \overline{w}(y3,z) \wedge w'(y1,y2) \wedge w(y3+y1-y2,z)$$

$$old(T(x,y) \wedge w(y,z))=ins\_T(x,y1) \wedge del\_T(x,y2) \wedge$$
$$T(x,y3) \wedge w(y3,z) \wedge w(y3+y1-y2,z); \qquad \text{New/old maps 2}$$

the transformation from w(y,z) to w'(y1,y2) and to $\overline{w}$(y3,z) may be given according to following Table 6:

| w(y, z) | w'(y1, y2) | $\overline{w}$(y3, z) |
|---------|-----------|-----------|
| y < z   | y1 < y2   | y3 >= z   |
| y <= z  | y1 < y2   | y3 > z    |
| y = z   | y1 <> y2  | y <> z    |
| y >= z  | y1 > y2   | y < z     |
| y > z   | y1 > y2   | y <= z    |
| y <> z  | y1 <> y2  | y = z     |

Application of general Formula 5 to Rule 5 may be summarized in following step-by-step description, taking into account that $L_1$=Department(d), $L_2$=SeniorCounter(d, x), and B=x=100.

Step 1: Application of general Formula 5 to Rule 5 for j=1 may produce following denial:

$$\perp \leftarrow new(Department(d)) \wedge (old(SeniorCounter(d,$$
$$x) \wedge x=100) \vee new(SeniorCounter(d,x) \wedge x=100)) \quad \text{<Rule 5 j=1>}$$

Step 2: Application of general Formula 5 to Rule 5 for j=2 may produce following denial:

$$\perp \leftarrow old(Department(d)) \wedge new(SeniorCounter(d,$$
$$x) \wedge x=100) \qquad \text{<Rule 5 j=2>}$$

Step 3: Elimination of logic operator $\vee$ in <Rule 5 j=1> may produce following denials:

$$\perp \leftarrow new(Department(d)) \wedge new(SeniorCounter(d,$$
$$x) \wedge x=100) \qquad \text{<Rule 5 j=1a>}$$

$$\perp \leftarrow new(Department(d)) \wedge old(Senior Counter(d,$$
$$x) \wedge x=100) \qquad \text{<Rule 5 j=1b>}$$

Step 4: Application to <Rule 5 j=1a> of New/old maps 1 for basic literals and New/old maps 2 for aggregate literals may produce following denial:

$$\perp \leftarrow ins\_Department(d) \wedge SeniorCounter(d,x) \wedge$$
$$ins\_SeniorCounter(d,x_i) \wedge del\_SeniorCounter(d,$$
$$x_d) \wedge x{\ne}100 \; \wedge x_i{\ne}x_d \wedge x{+}x_i{-}x_d{=}100 \qquad \text{Denial 6}$$

Step 5: Application to <Rule 5 j=1b> of New/old maps 1 for basic literals and New/old maps 2 for aggregate literals may produce following denial:

$$\perp \leftarrow ins\_Department(d)) \wedge SeniorCounter(d,x) \wedge$$
$$ins\_SeniorCounter(d,x_i) \wedge del\_SeniorCounter(d,$$
$$x_d) \wedge x=100 \; \wedge x{+}x_i{-}x_d{=}100 \qquad \text{Denial 7}$$

Step 6: Application to <Rule 5 j=2> of New/old maps 1 for basic literals and New/old maps 2 for aggregate literals may produce following denial:

$$\perp \leftarrow Department(d) \wedge \neg del\_Department(d) \wedge \wedge Senior\text{-}$$
$$Counter(d,x) \wedge ins\_SeniorCounter(d,x_i) \wedge del\_Se\text{-}$$
$$niorCounter(d,x_d) \wedge x{<}\,{>}100 \wedge x_i{<}\,{>}x_d \qquad \text{Denial 8}$$

In relation to Rule 6, its right part (WorksIn(e,d)∧Employee(e,age)∧age>40) may then be converted into rules taking into account differential or modified content (e.g. insertions and deletions in prospective tables) to be caused by the SQL update. This may be performed by taking into account insertions to be caused by the SQL update (data/tuples in prospective tables as to be inserted) and deletions to be caused by the SQL update (data/tuples in prospective tables as to be deleted).

With respect to insertions (to be caused by SQL update), following logics may be applied to compute aggregate value(s) for the data to be inserted.

Given any aggregation rule with n ordinary-literals and the built-in literals B:

$$p(\underline{x},f(y)) \leftarrow L_1 \wedge \ldots \wedge L_n \wedge B \qquad \text{Formula 6}$$

Aggregation rule(s) for insertions to be caused by SQL update may be obtained according to following general formula:

$$ins\_p_j(\underline{x},f(y)) \leftarrow \wedge_{i=1 \ldots j-1}(old(L_i)) \wedge new$$
$$(L_j) \wedge \wedge_{i=j+1 \ldots n}(old(L_i) \vee new(L_i)) \wedge B \qquad \text{Formula 7}$$

Application of general Formula 7 to Rule 6 may be summarized in following step-by-step description, taking into account that $L_1$=WorksIn(e,d), $L_2$=Employee(e,age), and B=age>40.

Step 1: Application of general Formula 7 to Rule 6 for j=1 may produce following rule:

$$ins\_SeniorCounter_1(d,count(e)) \leftarrow new(WorksIn(e,$$
$$d)) \wedge (old(Employee(e,age) \vee new(Employee(e,$$
$$age)) \wedge age{>}40 \qquad \text{<Rule 6i j=1>}$$

Step 2: Application of general Formula 7 to Rule 6 for j=2 may produce following rule:

$$ins\_SeniorCounter_2(d,count(e)) \leftarrow old(WorksIn(e,$$
$$d)) \wedge new(Employee(e,age) \wedge age{>}40 \qquad \text{<Rule 6i j=2>}$$

Step 3: Elimination of logic operator $\vee$ in <Rule 6i j=1> may produce following rules:

$$ins\_SeniorCounter_{1a}(d,count(e)) \leftarrow new(WorksIn(e,$$
$$d)) \wedge new(Employee(e,age) \wedge age{>}40 \qquad \text{<Rule 6i j=1a>}$$

$$ins\_SeniorCounter_{1b}(d,count(e)) \leftarrow new(WorksIn(e,$$
$$d)) \wedge old(Employee(e,age) \wedge age{>}40 \qquad \text{<Rule 6i j=1b>}$$

Step 4: Application to <Rule 6i j=1a> of New/old maps 1 for basic literals and New/old maps 2 for aggregate literals may produce following rule:

$$ins\_SeniorCounter_{1a}(d,count(e)) \leftarrow ins\_WorksIn(e,$$
$$d)) \wedge ins\_Employee(e,age) \wedge age{>}40 \qquad \text{Rule 7}$$

Said Rule 7 captures those senior people who are to be inserted as employees and workers of d at the same time.

Step 5: Application to <Rule 6i j=1b> of New/old maps 1 for basic literals and New/old maps 2 for aggregate literals may produce following rule:

$$\text{ins\_SeniorCounter}_{1b}(d,\text{count}(e))\leftarrow\text{ins\_WorksIn}(e,\\d))\wedge\text{Employee}(e,\text{age})\wedge\neg\text{del\_Employee}(e,\\\text{age})\wedge\text{age}>40 \qquad\qquad\text{Rule 8}$$

Rule 8 captures those people who are to be inserted as workers of d and were already employees and are not to be deleted as such.

Step 6: Application to <Rule 6i j=2> of New/old maps 1 for basic literals and New/old maps 2 for aggregate literals may produce following rule:

$$\text{ins\_SeniorCounter}_2(d,\text{count}(e))\leftarrow\\\text{WorksIn}(e,d)\wedge\neg\text{del\_WorksIn}(e,d))\wedge\text{ins\_Em-}\\\text{ployee}(e,\text{age})\wedge\text{age}>40 \qquad\qquad\text{Rule 9}$$

Such a Rule 9 captures those people who were already workers of d and are to be inserted as employees.

Intuitively, a further rule could be defined representing those people who were already workers of d and employees and are not to be deleted, but such a rule may be ignored since it does not capture new data or differential/modified content, but just the old or pre-update content.

Regarding deletions to be caused by SQL update, following logics may be applied to compute aggregate value(s) for the data to be deleted. Given any aggregation rule with n ordinary-literals and built-in literals B, such as the one expressed through previous Formula 6, aggregation rule(s) for deletions to be caused by SQL update may be obtained according to following general formula:

$$\text{del\_}p_j(\underline{x},f(y))\leftarrow\wedge_{i=1}\dots_{j-1}(\text{old}(L_i))\wedge\\\text{new}(\neg L_j)\wedge\vee_{i=j+1}\dots_n(L_i)\wedge B \qquad\qquad\text{Formula 8}$$

Application of general Formula 8 to Rule 6 may be summarized in following step-by-step description, taking into account that $L_1$=WorksIn(e,d), $L_2$=Employee(e,age), and B=age>40.

Step 1: Application of general Formula 8 to Rule 6 for j=1 may produce following rule:

$$\text{del\_SeniorCounter}_1(d,\text{count}(e))\leftarrow\text{new}(\neg\\\text{WorksIn}(e,d))\wedge\text{Employee}(e,\text{age})\wedge\text{age}>40 \qquad\text{<Rule 6d j=1>}$$

Step 2: Application of general Formula 8 to Rule 6 for j=2 may produce following rule:

$$\text{del\_SeniorCounter}_2(d,\text{count}(e))\leftarrow\text{old}(\text{WorksIn}(e,\\d))\wedge\text{new}(\neg\text{Employee}(e,\text{age}))\wedge\text{age}>40 \qquad\text{<Rule 6d j=2>}$$

Step 3: Application to <Rule 6d j=1> of New/old maps 1 for basic literals and New/old maps 2 for aggregate literals may produce following rule:

$$\text{del\_SeniorCounter}_1(d,\text{count}(e))\leftarrow\text{del\_WorksIn}(e,\\d)\wedge\text{Employee}(e,\text{age})\wedge\text{age}>40 \qquad\qquad\text{Rule 10}$$

Said Rule 10 captures those senior employees who are to be deleted as workers of d.

Step 4: Application to <Rule 6d j=2> of New/old maps 1 for basic literals and New/old maps 2 for aggregate literals may produce following rule:

$$\text{del\_SeniorCounter}_2(d,\text{count}(e))\leftarrow\\\text{WorksIn}(e,d)\wedge\neg\text{del\_WorksIn}(e,d)\wedge\text{del\_Em-}\\\text{ployee}(e,\text{age})\wedge\text{age}>40 \qquad\qquad\text{Rule 11}$$

This Rule 11 captures those senior people who are workers of d, are not to be deleted as workers of d, and are to be deleted as employee.

Translating Denials with Prospective Tables Back into SQL

Once denials dependent on prospective tables have been generated, these modified logic denials (see Denials 2-4, for instance) may be translated back to SQL. Since first-order logic formulas are known to be equivalent to relational-algebra, this is also a known processing as commented in other parts of the disclosure. In previous example, following three SQL views may be generated for Denials 2-4:

---

View corresponding to Denial 2:

```
CREATE VIEW 'ImportantManagersWorksInDepts1' AS
SELECT *
FROM ins_Manages AS ins
    JOIN del_WorksIn AS del ON (ins.emp = del.emp and ins.dept =
    del.dept)
WHERE ins.salary > 500
```

---

View corresponding to Denial 3:

```
CREATE VIEW 'ImportantManagersWorksInDepts2' AS
SELECT *
FROM ins_Manages AS ins
    ANTI JOIN WorksIn AS current ON (ins.emp = current.emp and
    ins.dept = current.dept)
    ANTI JOIN ins_WorksIn AS insW ON (ins.emp = insW.emp and
    ins.dept = insW.dept)
WHERE ins.salary > 500
```

---

View corresponding to Denial 4:

```
CREATE VIEW 'ImportantManagersWorksInDepts3' AS
SELECT *
FROM Manages AS current
    ANTI JOIN del_Manages AS del ON (del.emp = current.emp and
    del.dept = current.dept)
    JOIN del_WorksIn AS del ON (del.emp = current.emp and
    del.dept = current.dept)
WHERE current.salary > 500
```

---

ANTI JOINS may be rewritten in any particular RDBMS implementation (e.g. NOT EXISTS).

Translating logic denials back into SQL statements or views is performable automatically. In fact, translating first-order logics into relational algebra expressions, which is the core of SQL, is an already known result from Codd's Theorem. These known principles may be extended to translate first-order logics with aggregate literals into SQL with aggregates.

For the sake of self-completeness, a possible manner of performing this translation is provided in following Tables 7-10. The left column includes the logic expression or sub-expression to be translated; the middle column shows a pseudo-code that creates corresponding SQL expression or sub-expression, and the right column contains clarifications/ explanations. These Tables 7-10 also include translation rules to be applied when SQL assertion corresponds to relational algebra with aggregates (with and without negation).

TABLE 7

| | | |
|---|---|---|
| Translation of a denial | | |
| TrDenial(<br>:- bodyLiterals<br>) | q = new SQLQuery( )<br>TrLiterals(q, bodyLiterals)<br>return q | A new query is<br>created, the literals<br>inside the query are<br>translated, and final<br>query is returned |

TABLE 8

| | Translation of derivation rules | |
|---|---|---|
| TrDerRules(<br>  Lit(x1, ..., xn) :-<br>body1<br>  Lit(x1, ..., xn) :-<br>body2<br>) | q1 = TrDerRule(Lit(x1, ..., xn) :-<br>body1)<br><br>q2 = TrDerRule(Lit(x1, ..., xn) :-<br>body2)<br><br>return q1.union(q2) | In the case of two derivation rules with the very same literal in its left-hand side, both derivation rules are translated as two separate queries, which are finally unified |
| TrDerRules (<br>  Lit(x1, ..., xn, f(y)) :-<br>bodyLits<br>) | q = TrDerRule(Lit(x1, ..., xn))<br>q.addGroupBy(TrTerms(x1, ..., xn))<br>q.addSelectClause(TrTerm(f(y)))<br>return q | In the case of an aggregate function inside derivation rule to be translated, the SQL query without the aggregation is translated, a group by clause is added, and finally the aggregate function is added in the select clause |
| TrDerRules (<br>  Lit(x1, ..., xn) :-<br>bodyLits<br>) | q = new SQLQuery( )<br>q.AddSelectClause(TrTerms(x1, ..., xn))<br>TrLiterals(q, bodyLits)<br>return q | A new query is created, columns corresponding to x1, ..., xn are added as select clause, and bodyLits inside the created query are translated |

TABLE 9

| | Translation of literals | |
|---|---|---|
| TrLiterals(q,<br>  A1 $\land$ A2 $\land$ ... $\land$ An<br>) | TrLiteral(q, A1)<br>TrLiterals(q, A2, ..., An) | Translation of literals A1, ..., AN inside a query is performed by translating the first literal and translating the remaining literals recursively |
| TrLiteral(q,<br>  TableName(a1, ..., an)<br>) | q.addFromClause(TableName)<br>q.addWhereClause(joins(q, a1, ..., an)) | TableName literal is translated as a new table expression inside from clause, and corresponding joins are added. There is a join with a previously translated literal for every variable they share in common |
| TrLiteral(q,<br>  DerivedLit(a1, ..., an)<br>) | subQ = TrDerRules(DerivedLit(a1, .., an))<br>q.addFromClause(subQ)<br>q.addWhereClause(joins(q, a1, ..., an)) | DerivedLiteral is translated as a subquery inside from clause, corresponding joins are added similarly as before |
| TrLiteral(q,<br>  ¬Lit(a1, ..., an)<br>) | subQ = TrLiteral(Lit(a1, ..., an))<br>q.addWhereClause(notExists(subQ)) | Lit(a1, ..., an) is translated as a new subquery, and said subquery added in the where clause inside a SQL NOT EXISTS |
| TrLiteral(q,<br>  a1 opComp a2<br>) | q.addWhereClause(<br>  TrTerm(a1) opComp<br>TrTerm(a2)<br>  ) | Built-in literals are translated as a new comparison inside the where clause |

TABLE 10

| Translation of terms | | |
|---|---|---|
| TrTerm(<br>  variable<br>) | columnName | A variable with the<br>column name it is<br>representing is<br>translated |
| TrTerm(<br>  constant<br>) | constant | A constant for the very<br>same SQL constant is<br>translated |
| TrTerm(<br>  aggregate(y)<br>) | aggregateTrTerm(y)) | An aggregate function<br>with the very same<br>SQL aggregate<br>function is translated |

Denials 6-8 may also be translated into SQL according to these translation principles:

| View corresponding to Denial 6 |
|---|

```
CREATE VIEW 'DepartmentHave100Seniors1' AS
SELECT *
FROM ins_Department AS ins
    JOIN SeniorCounter AS currentCount ON (ins.dept =
    currentCount.dept)
    LEFT JOIN ins_SeniorCounter AS insCount ON (ins.dept =
    insCount.dept)
    LEFT JOIN del_SeniorCounter AS delCount ON (ins.dept =
    delCount.dept)
WHERE currentCount.total <>100 AND insCount.total <> delCount.total
AND currentCount.total+insCount.total−delCount.total = 100
```

| View corresponding to Denial 7 |
|---|

```
CREATE VIEW 'DepartmentHave100Seniors2' AS
SELECT *
FROM ins_Department AS ins
    JOIN SeniorCounter AS currentCount ON (ins.dept =
    currentCount.dept)
    LEFT JOIN ins_SeniorCounter AS insCount ON (ins.dept =
    insCount.dept)
    LEFT JOIN del_SeniorCounter AS delCount ON (ins.dept =
    delCount.dept)
    WHERE currentCount.total = 100 AND
    currentCount.total+insCount.total−delCount.total = 100
```

| View corresponding to Denial 8 |
|---|

```
CREATE VIEW 'DepartmentHave100Seniors3' AS
SELECT *
FROM Department AS dept
    JOIN SeniorCounter AS currentCount ON (dept.dept =
    currentCount.dept)
    LEFT JOIN ins_SeniorCounter AS insCount ON (dept.dept =
    insCount.dept)
    LEFT JOIN del_SeniorCounter AS delCount ON (dept.dept =
    delCount.dept)
    WHERE currentCount.total =
    100 AND currentCount.total+insCount.total−delCount.total = 100
```

If no tuple/row is returned, at runtime, by each of the above views corresponding to Denials 6-8, this means that SQL Assertion 3 will not be violated and, therefore, SQL update may be committed. Otherwise, it means that SQL Assertion 3 will be violated and, therefore, commit of the SQL update may be avoided.

Rules 7-9 may also be translated into SQL according to these translation principles:

| View corresponding to Rule 7 (ins_SeniorCounter$_{1a}$) |
|---|

```
CREATE VIEW 'ins_SeniorCounter1a' AS
SELECT wi.dept, count(wi.emp) AS total
FROM ins_WorksIn AS wi
    JOIN ins_Employee AS emp ON (emp.emp = wi.emp)
WHERE emp.age > 40
GROUP BY wi.dep
```

| View corresponding to Rule 8 (ins_SeniorCounter$_{1b}$) |
|---|

```
CREATE VIEW 'ins_SeniorCounter1b' AS
SELECT wi.dept, count(wi.emp) AS total
FROM ins_WorksIn AS wi
    JOIN Employee AS emp ON (emp.emp = wi.emp)
    ANTI JOIN del_Employee AS del_emp ON (del_emp.emp =
    emp.emp AND del_emp.age = emp.age)
WHERE emp.age > 40
GROUP BY wi.dep
```

| View corresponding to Rule 9 (ins_SeniorCounter$_2$) |
|---|

```
CREATE VIEW 'ins_SeniorCounter2' AS
SELECT wi.dept, count(wi.emp) AS total
FROM WorksIn AS wi
    ANTI JOIN del_WorksIn AS del_wi ON (wi.dept = del_wi.dept
AND wi.emp = del_wi.emp)
    JOIN ins_Employee AS emp ON (emp.emp = wi.emp)
WHERE emp.age > 40
GROUP BY wi.dep
```

And said three SQL views corresponding to Rules 7-9 may be summed at a further SQL view as the following one.

| View corresponding to ins_SeniorCounter (sum of Rules 7-9) |
|---|

```
CREATE VIEW 'ins_SeniorCounter' AS
SELECT ins1a.dept, ins1a.total+ins1b.total+ins2.total AS TOTAL
FROM ins_SeniorCounter1a AS ins1a
    OUTER JOIN ins_SeniorCounter1b AS ins1b ON (ins1a.dep =
    ins1b.dep)
    OUTER JOIN ins_SeniorCounter2 AS ins2 ON (ins1a.dep = ins2.dep)
```

Rules 10 and 11 may also be translated into SQL according to these translation principles:

| View corresponding to Rule 10 (del_SeniorCounter$_1$) |
|---|

```
CREATE VIEW 'del_SeniorCounter1' AS
SELECT wi.dept, count(wi.emp) AS total
FROM del_WorksIn AS wi
    JOIN Employee AS emp ON (emp.emp = wi.emp)
WHERE emp.age > 40
GROUP BY wi.dep
```

| View corresponding to Rule 11 (del_SeniorCounter$_2$) |
|---|

```
CREATE VIEW 'del_SeniorCounter2' AS
SELECT wi.dept, count(wi.emp) AS total
FROM WorksIn AS wi
    ANTI JOIN del_WorksIn AS del_wi ON (wi.emp =
    del_wi.emp AND wi.dep = del_wi.dep)
    JOIN del_Employee AS emp ON (emp.emp = wi.emp)
WHERE emp.age > 40
GROUP BY wi.dep
```

And said two SQL views corresponding to Rules 10 and 11 may be summed at a further SQL view as the following one.

| View corresponding to del_SeniorCounter (sum of Rules 10 and 11) |
| --- |
| CREATE VIEW 'del_SeniorCounter' AS<br>SELECT del1.dept, del1.total+del2.total AS TOTAL<br>FROM ins_SeniorCounter1 AS del1<br>    OUTER JOIN del_SeniorCounter2 AS del2 ON (del1.dep = del2.dep) |

Creation of Procedure to Commit or Abort SQL Update

The "SQL compilation" system still further includes a Procedure module 107 configured to create a procedure adapted to commit or abort, at run-time, execution of the SQL update onto the affected relational tables depending on whether the SQL assertion (to be checked) has been determined satisfied or dissatisfied, respectively. The procedure may check the satisfaction/dissatisfaction of the update by running the previously generated SQL views, and checking whether they return an empty result, or not. Then, the SQL update may be committed by e.g. transferring the differential or modified content of prospective table(s) to corresponding affected table(s).

Implementation of Modules and Methods

As used herein, the term "module" may be understood to refer to software, firmware, hardware and/or various combinations thereof. It is noted that the modules are exemplary. The modules may be combined, integrated, separated, and/or duplicated to support various applications. Also, a function described herein as being performed by a particular module may be performed by one or more other modules and/or by one or more other devices instead of or in addition to the function performed by the described particular module.

The modules may be implemented across multiple devices, associated or linked to corresponding "SQL compilation" systems proposed herein, and/or to other components that may be local or remote to one another. Additionally, the modules may be moved from one device and added to another device, and/or may be included in both devices, associated to corresponding "SQL compilation" systems proposed herein. Any software implementations may be tangibly embodied in one or more storage media, such as e.g. a memory device, a floppy disk, a compact disk (CD), a digital versatile disk (DVD), or other devices that may store computer code.

The "SQL compilation" systems according to present disclosure may be implemented by computer or computing system, electronics or a combination thereof. The computing system may be a set of instructions (e.g. a computer program) and then "SQL compilation" systems may comprise a memory and a processor, embodying said set of instructions stored in the memory and executable by the processor. These instructions may comprise functionality or functionalities to execute corresponding "SQL compilation" methods such as e.g. the ones described with reference to other figures.

In case the "SQL compilation" systems are implemented only by electronics means, a controller of the system may be, for example, a CPLD (Complex Programmable Logic Device), an FPGA (Field Programmable Gate Array) or an ASIC (Application-Specific Integrated Circuit).

In case the "SQL compilation" systems are a combination of electronics and a computer or computing system, the computing system may be a set of instructions (e.g. a computer program) and the electronics may be any electronic circuit capable of implementing corresponding "SQL compilation" methods proposed herein, such as the ones described with reference to other figures.

The computer program(s) may be embodied on a storage medium (for example, a CD-ROM, a DVD, a USB drive, a computer memory or a read-only memory) or carried on a carrier signal (for example, on an electrical or optical carrier signal).

The computer program(s) may be in the form of source code, object code, a code intermediate source and object code such as in partially compiled form, or in any other form suitable for use in implementing "SQL compilation" methods according to present disclosure. The carrier may be any entity or device capable of carrying the computer program(s).

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other devices, apparatuses or systems.

When the computer program(s) is/are embodied in a signal that may be conveyed directly by a cable or other device or apparatus or system, the carrier may be defined by or as such cable or other device or apparatus or system. Alternatively, the carrier may be an integrated circuit in which the computer program(s) is/are embedded, the integrated circuit being adapted for performing, or for use in the performance of, "SQL compilation" methods proposed herein.

FIG. 2 is a flow chart schematically illustrating "SQL compilation" methods performable by systems equal or similar to the ones described with reference to FIG. 1. Compilation methods may be initiated (e.g. at block 200) upon detection of a starting condition such as e.g. a request for starting the method or an invocation of the method from RDMs 100. Since compilation methods according to FIG. 2 are performable by compilation systems according to FIG. 1, number references from FIG. 1 may be used in following description of FIG. 2.

Compilation methods may further include (e.g. at block 201) creating trigger(s) configured to simulate, at run-time, execution of the SQL update by providing prospective table(s) 108 with a differential or modified content to be caused by execution of the SQL update, while keeping unaltered the pre-update content of affected database tables 104. This functionality implemented at block 201 may be performed by e.g. trigger module such as the trigger module 106 previously described with reference to FIG. 1. Functional details and considerations explained about said trigger module 106 may thus be similarly attributed to method block 201.

Compilation methods may still further include (e.g. at block 202) converting the SQL assertion to be checked into SQL view(s) configured to determine, at run-time, satisfaction or dissatisfaction of the SQL assertion depending on pre-update content of the affected database table(s) 104 and differential or modified content of the prospective table(s) 108. This functionality implemented at block 202 may be performed by e.g. SQL-view module such as the SQL view module 105 previously described with reference to FIG. 1. Functional details and considerations explained about said SQL view module 105 may thus be similarly attributed to method block 202.

Compilation methods may yet further include (e.g. at block 203) creating a procedure configured to commit or abort, at run-time, execution of the SQL update onto affected table(s) depending on whether the SQL assertion to be checked has been determined satisfied or dissatisfied, respectively. This functionality implemented at block 203 may be performed by e.g. Procedure module such as the procedure module 107 previously described with reference to FIG. 1. Functional details and considerations explained about said procedure module 107 may thus be similarly attributed to method block 203.

Compilation methods may terminate (e.g. at block 204) when an ending condition is detected such as e.g. once the procedure configured to commit or abort, at run-time, execution of the SQL update has been created.

FIG. 3 is a flow chart schematically illustrating examples of converting SQL assertion into SQL views suitable for SQL conversion (sub-) methods such as the ones described with reference to block 202 in FIG. 2. This (sub-) methods of converting SQL assertion into SQL views may be performed by e.g. SQL-view module such as the SQL view module 105 previously described with reference to FIG. 1. Functional details and considerations explained about said SQL view module 105 may thus be similarly attributed to this conversion of SQL assertion into SQL views.

Conversion (sub-) methods may be initiated (e.g. at block 300) once simulation triggers have been created at e.g. block 201 of FIG. 2.

Conversion (sub-) methods may further include (e.g. at block 301) translating SQL assertion to be checked into logic rules considering only affected tables (pre-update content). Functional details and considerations explained about said translation of SQL assertion into logic rules within the context of SQL view module 105 in FIG. 1 may be similarly attributed to method block 301.

Conversion (sub-) methods may further include (e.g. at block 302) verifying whether logic rules (from block 301) include some derivation rule(s) and, in this case, converting said derivation rule(s) into aggregation rule(s). Functional details and considerations explained about said conversion of derivation rules into aggregation rules within the context of SQL view module 105 may be similarly attributed to method block 302.

Conversion (sub-) methods may further include (e.g. at block 303) modifying logic rules (from block 302) to further consider prospective tables (differential or modified content). Functional details and considerations explained about said modification of logic rules within the context of SQL view module 105 may be similarly attributed to method block 303.

Conversion (sub-) methods may further include (e.g. at block 304) translating logic rules (from block 303) back to SQL to generate SQL views configured to determine, at run-time, satisfaction or unsatisfaction of the SQL assertion. Functional details and considerations explained about said translation of logic rules back to SQL within the context of module 105 may be similarly attributed to method block 304.

Conversion (sub-) methods may terminate (e.g. at block 305) when SQL views to check satisfaction of SQL assertion have been created.

Although only a number of examples have been disclosed herein, other alternatives, modifications, uses and/or equivalents thereof are possible. Furthermore, all possible combinations of the described examples are also covered. Thus, the scope of the disclosure should not be limited by particular examples, but it should be determined only by a fair reading of the claims that follow.

The invention claimed is:

1. A method for a Relational Database Management System, RDMS, to compile an SQL assertion into a set of SQL statements or views configured to check, at run-time, post-update satisfaction of the SQL assertion which means satisfaction of the SQL assertion after execution of an SQL update;

the RDMS comprising SQL assertions including the SQL assertion to be checked and relational tables having a consistent pre-update state, which means that the SQL assertions are satisfied before execution of the SQL update;

the SQL update and the SQL assertion to be checked affect or refer to one or more of the relational tables having a pre-update content which means content before execution of the SQL update; the method comprising:

creating, by execution of a CREATE TRIGGER statement, one or more SQL database triggers configured to simulate, at run-time, execution of the SQL update by providing one or more prospective relational tables, which are distinct from the affected relational tables, with a differential or modified content to be caused by execution of the SQL update, while keeping unaltered the pre-update content of the affected relational tables;

converting the SQL assertion to be checked into SQL statements or views configured to determine, at run-time, satisfaction or dissatisfaction of the SQL assertion depending on the pre-update content of the affected relational tables and the differential or modified content of the prospective relational tables; and creating a procedure configured to commit or abort, at an end of a transaction responding to the SQL update, execution of the SQL update onto the affected relational tables depending on whether the SQL assertion to be checked has been determined satisfied or dissatisfied, respectively.

2. A method according to claim 1, the converting the SQL assertion to be checked into SQL statements or views comprising:

translating the SQL assertion to be checked into logics considering the affected relational tables;

modifying the logics to further consider the prospective relational tables; and translating the modified logics back to SQL to generate the SQL statements or views.

3. A method according to claim 2, the translating the SQL assertion to be checked into logics and translating the logics back to SQL are based on Codd's theorem.

4. A method according to claim 2, the translating the SQL assertion to be checked into logics comprising translating the SQL assertion into logical rules including logic denials defining when the SQL assertion is violated, each of the logic denials having following form:

$$\perp \leftarrow L_1 \wedge \ldots \wedge L_n \wedge B;$$

$L_{i=1 \ldots n}$ being ordinary literals defining data existence or inexistence in affected tables, and B is a built-in literal defining selection of said existent or inexistent data causing violation of the SQL assertion.

5. A method according to claim 4, each of the ordinary literals $L_{i=1 \ldots n}$ being a basic literal or an aggregate literal or a derived literal; and the translating the SQL assertion into logical rules including, in case of derived literal, producing at least one derivation rule defining calculation of the derived literal and, in case of aggregate literal, producing at least one aggregation rule defining calculation of the aggregate literal.

6. A method according to claim 5, the translating SQL assertion into logical rules including applying an unfolding technique to minimize number of derivation rules.

7. A method according to claim 5, the translating SQL assertion into logical rules including translating derived literal and derivation rule or rules defining calculation thereof into aggregate literal and aggregation rule or rules defining calculation thereof.

8. A method according to claim 5, the modifying the logics to further consider the prospective relational tables including applying a disjunctive normal form transformation so that said modifying of the logics does not produce any logical rule with OR operator.

9. A method according to claim 5, the modifying the logics to further consider the prospective relational tables including applying following formula to each logic denial:

$$\perp \leftarrow \bigwedge_{i=1 \ldots j-1}(\text{old}(L_i) \wedge \text{new}(L_j) \wedge \bigvee \bigwedge_{i=j+1 \ldots n}(\text{old}(L_i) \vee \text{new}(L_i)) \wedge B;$$

the function old(L) defining that L is true in the pre-update content and remains true with the differential or modified content, and function new(L) represents that the differential or modified content causes L to be true.

10. A method according to claim 9, the functions new(L) and old(L) being defined as follows when L is a basic literal:

new(L)=new(T)=ins_T, defining that existence of data T, expressed as T, is new if data T is within differential content as to be inserted by the SQL update;

new(L)=new(¬T)=del_T, defining that inexistence of data T, expressed as ¬T, is new if data T is within differential content as to be deleted by the SQL update;

old(L)=old(T)=T∧¬del_T, defining that existence of data T, expressed as T, is old if data T is within pre-update content and is not within differential content as to be deleted by the SQL update;

old(L)=old(¬T)=¬T∧¬ins_T, defining that inexistence of data T, expressed as ¬T, is old if data T is not within pre-update content and is not within differential content as to be inserted by the SQL update.

11. A method according to claim 9, the functions new(L) and old(L) being defined as follows when L is an aggregate literal:

$$\text{new}(T(x,y) \wedge w(y,z))=\text{ins\_}T(x,y1) \wedge \text{del\_}T(x,y2) \wedge T(x,y3) \wedge \overline{w}(y3,z) \wedge w'(y1,y2) \wedge w(y3+y1-y2,z)$$

$$\text{old}(T(x,y) \wedge w(y,z))=\text{ins\_}T(x,y1) \wedge \text{del\_}T(x,y2) \wedge T(x,y3) \wedge \overline{w}(y3,z) \wedge w(y3+y1-y2,z);$$

L referring to data T(x, y) in which x is a set of GROUP BY columns and y is aggregate value corresponding to said set of GROUP BY columns; and w(y, z) is a condition referred to data T(x, y) and transformable into w'(y1, y2) and into $\overline{w}$(y3, z) according to following table:

| w(y, z) | w'(y1, y2) | $\overline{w}$(y3, z) |
|---------|------------|-----------------------|
| y < z | y1 < y2 | y3 >= z |
| y <= z | y1 < y2 | y3 > z |
| y = z | y1 <> y2 | y <> z |
| y >= z | y1 > y2 | y < z |
| y > z | y1 > y2 | y <= z |
| y <> z | y1 <> y2 | y = z. |

12. A method according to claim 5, the producing at least one aggregation rule defining calculation of the aggregate literal including:

producing one or more insertion aggregation rules defining calculation part of the aggregate literal due to data included in differential content as to be inserted by the SQL update;

producing one or more deletion aggregation rules defining calculation part of the aggregate literal due to data included in differential content as to be deleted by the SQL update.

13. A method according to claim 12, the aggregation rule has following form:

$$p(\underline{x}, f(y)) \leftarrow L_1 \wedge \ldots \wedge L_n \wedge B;$$

and producing one or more insertion aggregation rules including applying following formula to said aggregation rule:

$$\text{ins\_}p_j(x, f(y)) \leftarrow \bigwedge_{i=1 \ldots j-1}(\text{old}(L_i)) \wedge \text{new}(L_j) \wedge \bigwedge_{i=j+1 \ldots n}(\text{old}(L_i) \vee \text{new}(L_i)) \wedge B.$$

14. A method according to claim 12, the aggregation rule has following form:

$$p(\underline{x}, f(y)) \leftarrow L_1 \wedge \ldots \wedge L_n \wedge B;$$

and the producing one or more deletion aggregation rules including applying following formula to said aggregation rule:

$$\text{del\_}p_j(\underline{x}, f(y)) \leftarrow \bigwedge_{i=1 \ldots j-1}(\text{old}(L_i)) \wedge \text{new}(\neg L_j) \wedge \bigvee \bigwedge_{i=j+1 \ldots n}(L_i) \wedge B.$$

15. A system for a Relational Database Management System, RDMS, to compile an SQL assertion into a set of SQL statements or views configured to check, at run-time, post-update satisfaction of the SQL assertion which means satisfaction of the SQL assertion after execution of an SQL update;

the RDMS SQL assertions including the SQL assertion to be checked and relational tables having a consistent pre-update state, which means that the SQL assertions are satisfied before execution of the SQL update;

the SQL update and the SQL assertion to be checked affect or refer to one or more of the relational tables having a pre-update content which means content before execution of the SQL update; the system comprising:

a processor, and a memory storing executable instructions that, when executed by the processor, cause the system to perform a method of:

creating, by execution of a CREATE TRIGGER statement, one or more SQL database triggers configured to simulate, at run-time, execution of the SQL update by providing one or more prospective relational tables, which are distinct from the affected relational tables, with a differential or modified content to be caused by execution of the SQL update, while keeping unaltered the pre-update content of the affected relational tables;

converting the SQL assertion to be checked into SQL statements or views configured to determine, at run-time, satisfaction or dissatisfaction of the SQL assertion depending on the pre-update content of the affected relational tables and the differential or modified content of the prospective relational tables; and creating a procedure configured to commit or abort, at an end of a transaction corresponding to the SQL update, execution of the SQL update onto the affected relational tables depending on whether the SQL assertion to be checked has been determined satisfied or dissatisfied, respectively.

\* \* \* \* \*